United States Patent

Schreiner et al.

[11] Patent Number: 5,879,559
[45] Date of Patent: Mar. 9, 1999

[54] VALVE CONTROLLER FOR WATER CONDITIONING SYSTEM

[75] Inventors: Michael R. Schreiner, Port Washington; Sheldon P. Carr, West Bend; Nick W. Buettner, Burlington, all of Wis.

[73] Assignee: Erie Manufacturing Company, Milwaukee, Wis.

[21] Appl. No.: 726,961

[22] Filed: Oct. 7, 1996

[51] Int. Cl.⁶ .............................. B01D 24/46; B01J 49/00; F16K 11/06

[52] U.S. Cl. ............................ 210/662; 210/670; 210/140; 210/141; 210/143; 210/190; 210/278; 137/624.14; 137/624.21; 137/625.65

[58] Field of Search ......................... 210/662, 670, 210/687, 96.1, 138–141, 143, 190, 191, 269, 277–279; 200/35 R, 37 R; 137/624.21, 624.14, 624.15, 625.64, 625.65

[56] References Cited

U.S. PATENT DOCUMENTS

| | | | |
|---|---|---|---|
| 2,800,229 | 7/1957 | Spaulding, Jr. | 210/142 |
| 2,902,155 | 9/1959 | Lundeen | 210/105 |
| 2,962,437 | 11/1960 | Lindsay | 210/35 |
| 3,742,768 | 7/1973 | Fleckenstein et al. | 74/3.52 |
| 3,867,961 | 2/1975 | Rudelick | 137/625.29 |
| 3,976,101 | 8/1976 | Bassett | 137/624.15 |
| 4,104,158 | 8/1978 | Davis | 210/662 |
| 4,181,605 | 1/1980 | Braswell | 210/19 |
| 4,235,718 | 11/1980 | Lopez | 210/191 |
| 4,237,538 | 12/1980 | Le Dall | 364/500 |
| 4,290,451 | 9/1981 | Fleckenstein et al. | 137/624.15 |
| 4,298,025 | 11/1981 | Prior et al. | 137/624.14 |
| 4,313,825 | 2/1982 | Fleckenstein et al. | 210/89 |
| 4,385,992 | 5/1983 | Clauer et al. | 210/662 |
| 4,632,150 | 12/1986 | Gagas | 137/625.46 |
| 4,722,797 | 2/1988 | Gauer et al. | 210/662 |
| 4,737,275 | 4/1988 | Franks | 210/91 |
| 4,884,798 | 12/1989 | Fox | 137/624.14 |
| 4,990,245 | 2/1991 | Wieme | 210/138 |
| 5,022,994 | 6/1991 | Avery | 210/670 |
| 5,045,187 | 9/1991 | Suchanek | 210/140 |
| 5,116,491 | 5/1992 | Brane | 210/143 |
| 5,157,979 | 10/1992 | Brane et al. | 74/58 |
| 5,544,072 | 8/1996 | Zimmerman et al. | 137/624.14 |
| 5,590,687 | 1/1997 | Vaughan | 137/624.15 |

Primary Examiner—Thomas G. Wyse
Attorney, Agent, or Firm—Terrence Martin; Sean Detweiler; Andrew McConnell

[57] ABSTRACT

A control unit for operating a valve system in a water conditioner system includes a drive motor having an output shaft coupled to the valve system, a valve position slide switch, an electronic regeneration controller, and a settable mechanical clock. The electronic controller can be programmed by the use of electrical jumpers/dip switches/control knobs. As the drive motor drives the output shaft coupled to the valve system, the drive motor also contemporaneously rotates a dual lead screw in the valve position slide switch. The dual lead screw drives an electrical contactor along a series of electrical contacts in a closed loop fashion. Each of the discrete electrical contacts corresponds to a position of the valve. The electronic controller controls the position of the valve in accordance with dwell times programmed into the electronic controller. If a demand regeneration scheme is desirable, a hardness setting rotary potentiometer can be used to provide analog electrical control.

44 Claims, 12 Drawing Sheets

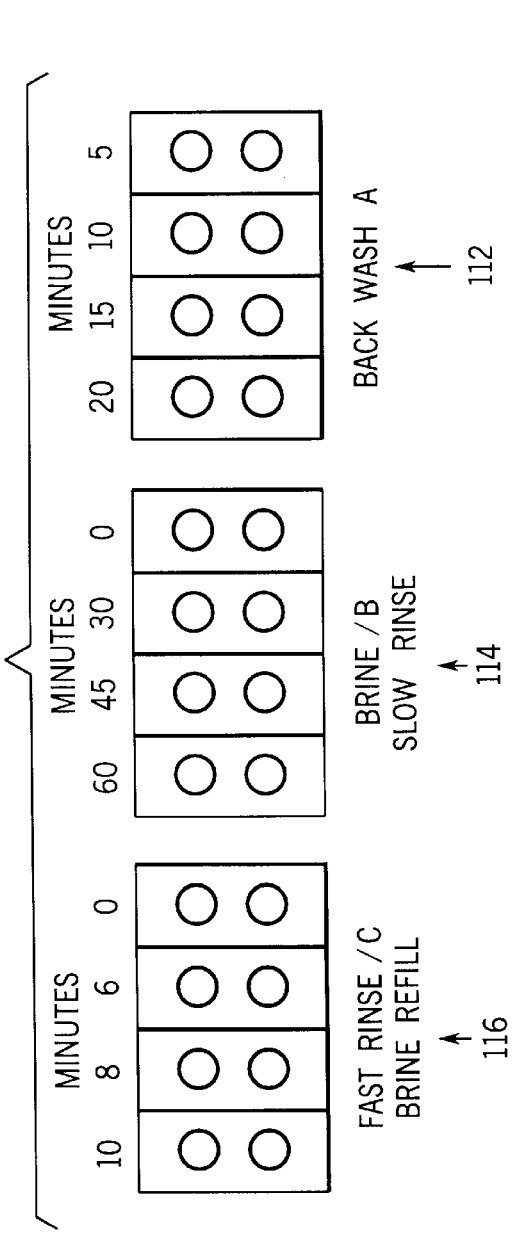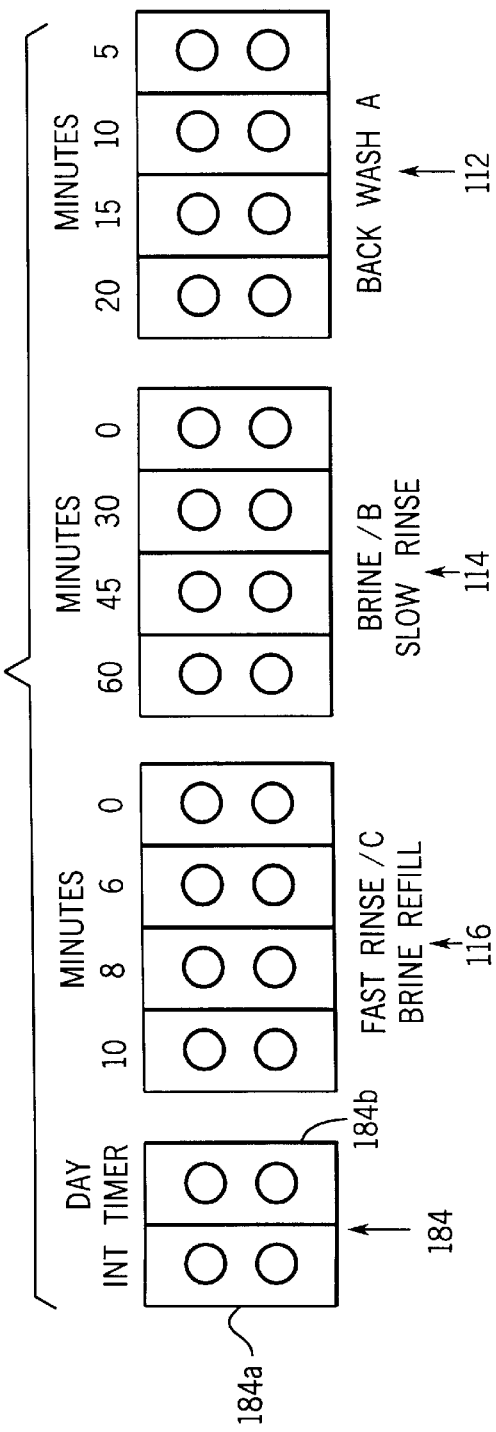

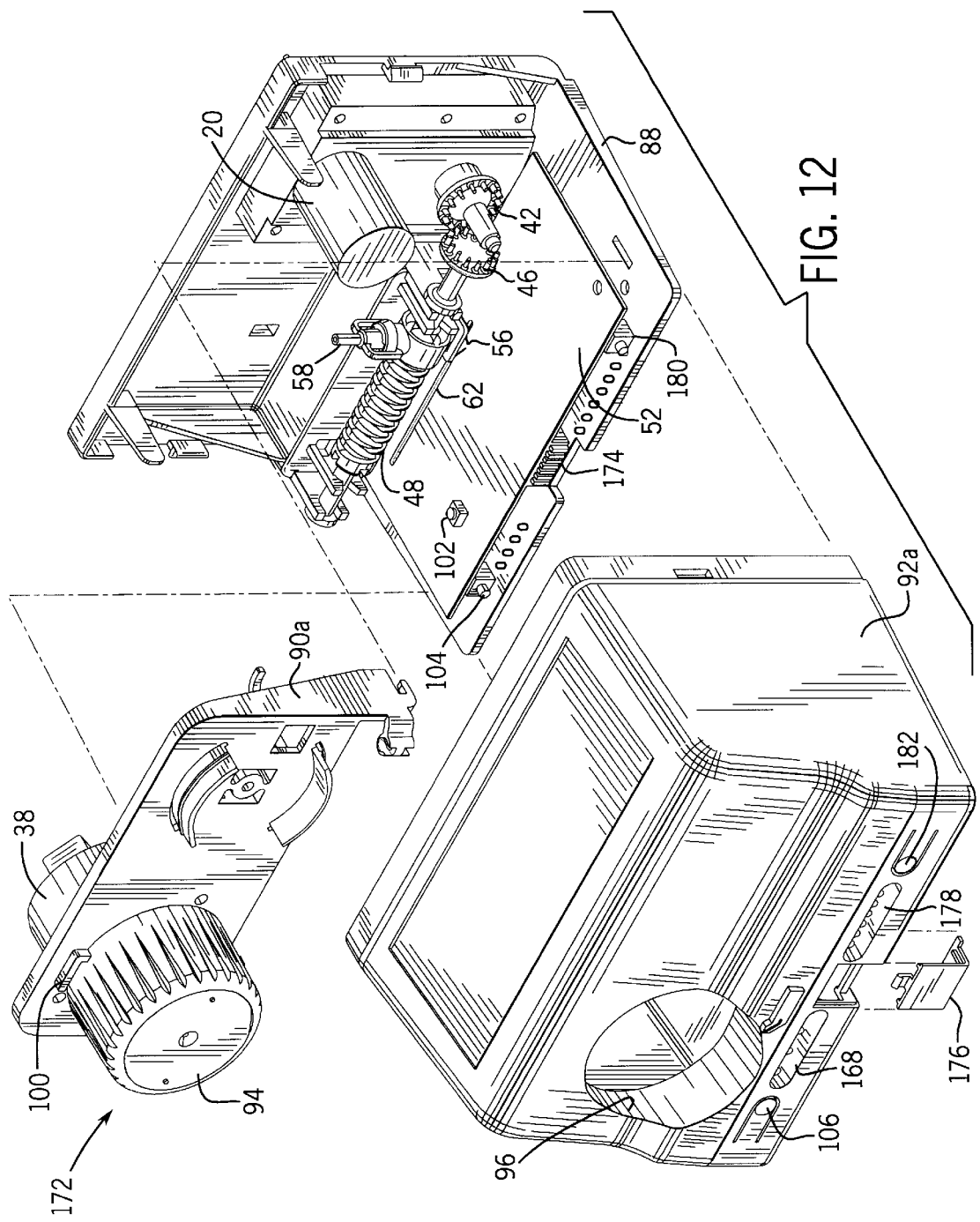

VALVE CONTROLLER FOR WATER CONDITIONING SYSTEM

FIELD OF THE INVENTION

The invention relates to the regeneration of ion exchange resins in a water conditioning system. In particular, the invention relates to a manner of controlling the operation of a valve system for the process of backwashing and regenerating exhausted ion exchange resins.

BACKGROUND OF THE INVENTION

Water conditioners generally have a mineral tank containing a bed of an ion exchange resin, such as a polystyrene resin. Most ion exchange resins are insoluble and act as permanent anions (i.e., ions with negative charges) to which exchangeable sodium ions ($Na^+$) can attach. When a water conditioning system is in service, raw untreated water (i.e. hard water), containing mineral ions such as calcium ions ($Ca^{++}$) and magnesium ions ($Mg^{++}$), is fed into the mineral tank typically at a location above the bed of ion exchange resin. A riser tube or standpipe in the mineral tank provides an outlet for water that has been filtered through and conditioned by the resin bed (i.e., the standpipe is an outlet for soft water). Filtering raw water through the ion exchange resin filters out non-ionic debris to remove turbidity in the water. Also, hard water passes through the ion exchange resin, the calcium ($Ca^{++}$) and magnesium ($Mg^{++}$) ions in the hard water displace the sodium ions ($Na^+$) from the ion exchange resin. The calcium ($Ca++$) and magnesium ($Mg^{++}$) ions have a greater affinity for the resin than do the sodium ions ($Na^+$). In this manner, the offensive hardening ions (i.e. $Ca^{++}$ and $Mg^{++}$) are replaced in the water by a chemically equivalent concentration of sodium ions ($Na^+$).

The conditioning or softening process continues until the initial supply of sodium ions ($Na^+$) in the ion exchange resin is depleted to a point that the hardening ions ($Ca^{++}$) and ($Mg^{++}$) are no longer effectively removed. At this point, hardness begins to appear in the water exiting the system, and the ion exchange resin is considered exhausted.

Although calcium ($Ca^{++}$) and magnesium ($Mg^{++}$) ions have a greater affinity for the ion exchange resin than do sodium ions ($Na^+$), the chemical reaction can be reversed if a high enough concentration of sodium ions ($Na^+$) are introduced to the ion exchange resin. An exhausted, or partially exhausted ion exchange resin can therefore be regenerated by introducing a solution of common salt (i.e. sodium chloride, NaCl) into the mineral tank.

Water conditioning systems operate in a service cycle and a regeneration cycle. In the service cycle, untreated raw water flows down through the mineral tank and up through the standpipe for use. The water is conditioned/filtered when passing through the mineral tank. When the water conditioner is taken out of service for the regeneration cycle, raw water for residential use bypasses the mineral tank untreated.

The regeneration cycle includes three modes: a backwash mode, a brine/slow rinse mode, and a fast rinse/brine refill mode. In the backwash mode, water flows down through the standpipe in the mineral tank and up through the ion exchange resin bed. Debris and/or filtered material in the resin bed are flushed from the bed during the backwash mode. In the brine/slow rinse mode, a brine solution is drawn from a brine tank into the mineral tank, and flows down through the resin bed and up through the standpipe. This process regenerates the ion exchange resin. Typically, brine is drawn from the brine tank until an air check in the brine tank closes. Once the air check closes, the system switches to a slow rinse mode. The slow rinse mode consists of a slow flow of water through the mineral tank down through the ion exchange resin and up through the standpipe. In the fast rinse/brine refill mode, water is flushed through the mineral tank down through the ion exchange resin and up through the standpipe to remove any remaining brine in the mineral tank. Usually, the brine tank is refilled with water at the same time.

Most water conditioning systems include complicated valve systems to provide for these multiple cycles that are necessary to regenerate a water conditioning system. Years ago the valve systems were controlled manually, but now mechanical and electronic control systems are available to control the operation of these complicated valve systems. In many applications, control systems improve the effectiveness, efficiency and convenience of water conditioning systems.

Since the water conditioner must be taken out of service for the regeneration cycle (i.e. backwash, brine/slow rinse, fast rinse/brine refill), it is normally desirable to start the regeneration cycle at a predetermined time of day such as 2:00 AM when it is unlikely that there will be a demand for conditioned water. Automatic control systems provide a convenient way to start regeneration at 2:00 AM.

Some water conditioning systems have controls that set the start of the regeneration cycle after a fixed number of days (i.e. an interval regeneration scheme), while others set the start of the regeneration cycle on selected days of the week (i.e. a dayof-the-week scheme). Still other water conditioning systems have controls that monitor the volume of conditioned water used, and start the regeneration cycle at the selected predetermined time (e.g. 2:00 AM) on the day following the day in which water usage exceeds a preset water usage limit (i.e. a demand regeneration scheme). Water conditioners implementing a demand regeneration scheme tend to make consistent effective use of salt in the brine tank if properly programmed for the particular application.

It is desirable that the control system be easy for a technician to customize to a particular application. It is also desirable that the control system be convenient for lay people to make simple adjustments.

In general, mechanical controls for water conditioner valve systems can be cumbersome, and can also have durability problems. On the other hand, while fully electronic systems can be customized, fully electronic systems tend to be expensive. In addition, key pad displays for fully electronic systems can also be confusing and difficult for lay people to program.

BRIEF SUMMARY OF THE INVENTION

The invention is an electromechanical control unit for controlling the operation of a valve system in a water conditioner. The invention provides an effective and practical way to control a water conditioning valve system. An electromechanical control unit constructed in accordance with the invention is durable and easy to program.

In one aspect, the invention is a valve position control system which includes a mechanical clock that actuates a mechanical electric switch in a settable time of day, such as 2:00 AM, and an electronic regeneration controller that begins a regeneration cycle when a regeneration ready signal is present in the system indicating that the water conditioning system is ready for regeneration cycle, and the mechanical clock actuates the mechanical electric switch. A feedback interface mechanism provides inputs to the electronic regeneration controller indicative of the position of the valve. After a dwell time corresponding to the position of the valve, the electronic controller outputs a signal to move the valve to the next position in the regeneration cycle. The electronic regeneration controller preferably includes solid state circuitry that can be programmed to customize timing in the regeneration cycle.

The control system can generate the regeneration ready signal in accordance with a demand regeneration scheme, a day-of-the-week regeneration scheme, a day in a row regeneration scheme, or a demand regeneration scheme with the day override. The preferred way of carrying out a demand regeneration scheme includes the use of a water flow meter system outputting a cumulative water usage signal, and a water usage comparator that receives the cumulative water usage signal and outputs the regeneration ready signal when the cumulative water usage signal reaches a water usage set point value. It is desirable that the water usage set point value be able to be manually adjusted, such as with an adjustable potentiometer. In a day-of-the-week or interval regeneration scheme, the regeneration ready signal is generated by an electronic day counter when the day count within the day counter reaches a preselected value.

The feedback interface is preferably an electromechanical valve position slide switch that is particularly effective for this application. When the drive motor drives the valve, the drive motor contemporaneously drives the valve position slide switch within the control unit. The valve position slide switch generally includes a circuit board having a series of discrete electrical contacts spaced physically along a path on the circuit board preferably defined by a slot in the circuit board, a movable carriage that carries an electrical contactor along the slot among the series of electrical contacts, and a dual lead screw which is rotated by the drive motor and in turn drives the carriage among the series of electrical contacts. Each of the discrete electrical contacts on the circuit board corresponds to one of the valve positions (i.e. service, backwash, brine/slow rinse, fast rinse). The invention preferably uses a group of three sets of electrical jumper connections for programming the dwell time of each of the modes in the regeneration cycle.

The preferred valve position slide switch includes a follower coupled to the movable carriage. The follower has an indexing member that resides at least in part within the threads of the dual lead screw and is pushed by the threads of the dual lead screw when the dual lead screw is rotated to drive the carriage and the electrical contactor from the discrete electrical contacts on the board. The dual lead screw has a threaded portion that includes forward threads and reverse threads. Rotating the dual lead screw pushes the carriage in a forward direction until the carriage reaches a distant end of the forward threads and then continuing to rotate the dual lead screw in the same direction drives the carriage in the reverse direction until the carriage reaches the starting end. The preferred electromechanical control unit, thus, converts unidirectional output from a drive motor into a full-circle, closed-loop electromechanical control scheme.

The invention preferably uses a mechanical clock that rotates one full revolution during a 24 hour period. The mechanical clock preferably has a trigger finger that rotates with the clock, and activates the mechanical electric switch each time the mechanical clock completes a revolution. The mechanical clock can be set so that the trigger finger actuates the electric switch at 2:00 AM (or any other desired time), thus allowing regeneration cycles to begin at 2:00 AM (or other desired time) only.

A control unit in accordance with the invention can be conveniently programmed by a technician by setting dip switches and jumper connections. In addition, the control unit can be easily adjusted by a lay person using control knobs. Furthermore, a control unit in accordance with the invention is more durable than purely mechanical systems.

A control unit in accordance with the invention thus allows regeneration cycle timing to be customized easily, but does not require a key pad display which tends to confuse lay people.

Other advantages and features of the invention will be apparent to those skilled in the art after reviewing the following drawings and the description thereof.

BRIEF DESCRIPTION OF THE DRAWINGS

FIG. 9 is a schematic drawing showing preferred electrical jumper connections for the embodiment of the invention shown in FIG. 3.

FIG. 12 is an exploded perspective view of the second embodiment of the invention.

FIG. 13 is a schematic diagram illustrating the preferred electrical jumper connections in the embodiment of the invention shown in FIG. 12.

DETAILED DESCRIPTION OF THE INVENTION

Figure 1:
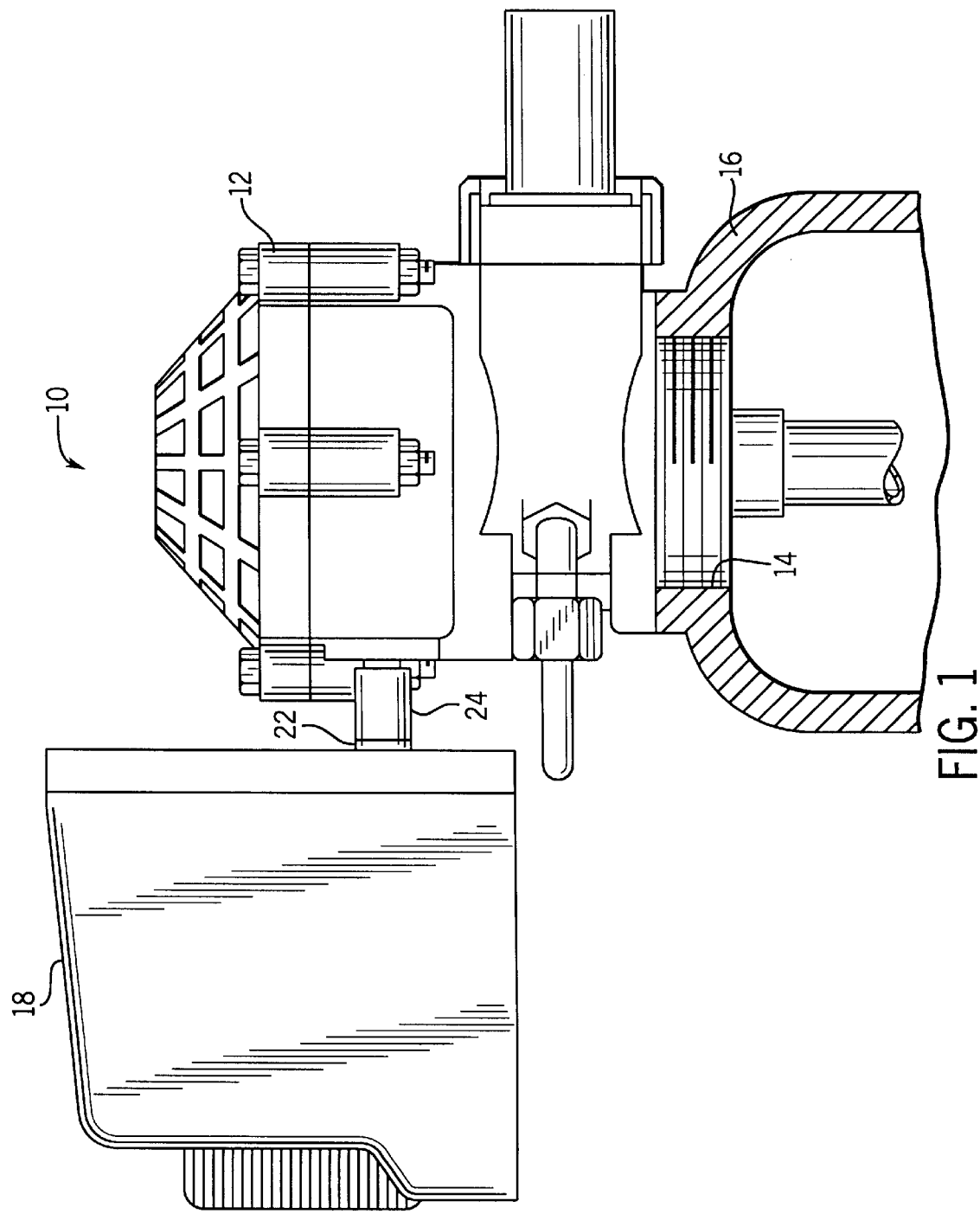
FIG. 1 is a side view of a portion of a water conditioning system having a control unit operating a rotary valve assembly in accordance with the invention.

FIG. 1 shows part of a water conditioning system 10 having a rotary valve 12 secured to a threaded opening 14 of a mineral tank 16. The rotary valve 12 directs the flow of water and brine into and from the mineral tank 16. The rotary valve 12 is preferably of the type shown in U.S. Pat. No. 4,632,150 which is assigned to the assignee of the present application and is incorporated herein by reference. An electromechanical control unit 18 controls the operation of the rotary valve 12. The control unit 18 has a drive motor 20 (FIG. 3) with an output shaft 22 that is connected through coupler 24 to selectively rotate a gear assembly within the rotary valve 12, thus controlling the operation of the rotary valve 12 for the regeneration of a bed of an ion exchange resin within the mineral tank 16. The control unit 18 controls the valve 12 so that the water conditioner 10, which normally operates in a service mode to provide conditioned water to a residence, can be automatically operated in a regeneration cycle (i.e. a backwash mode, a brine/slow rinse mode, and a fast rinse/brine refill mode).

Figure 2:
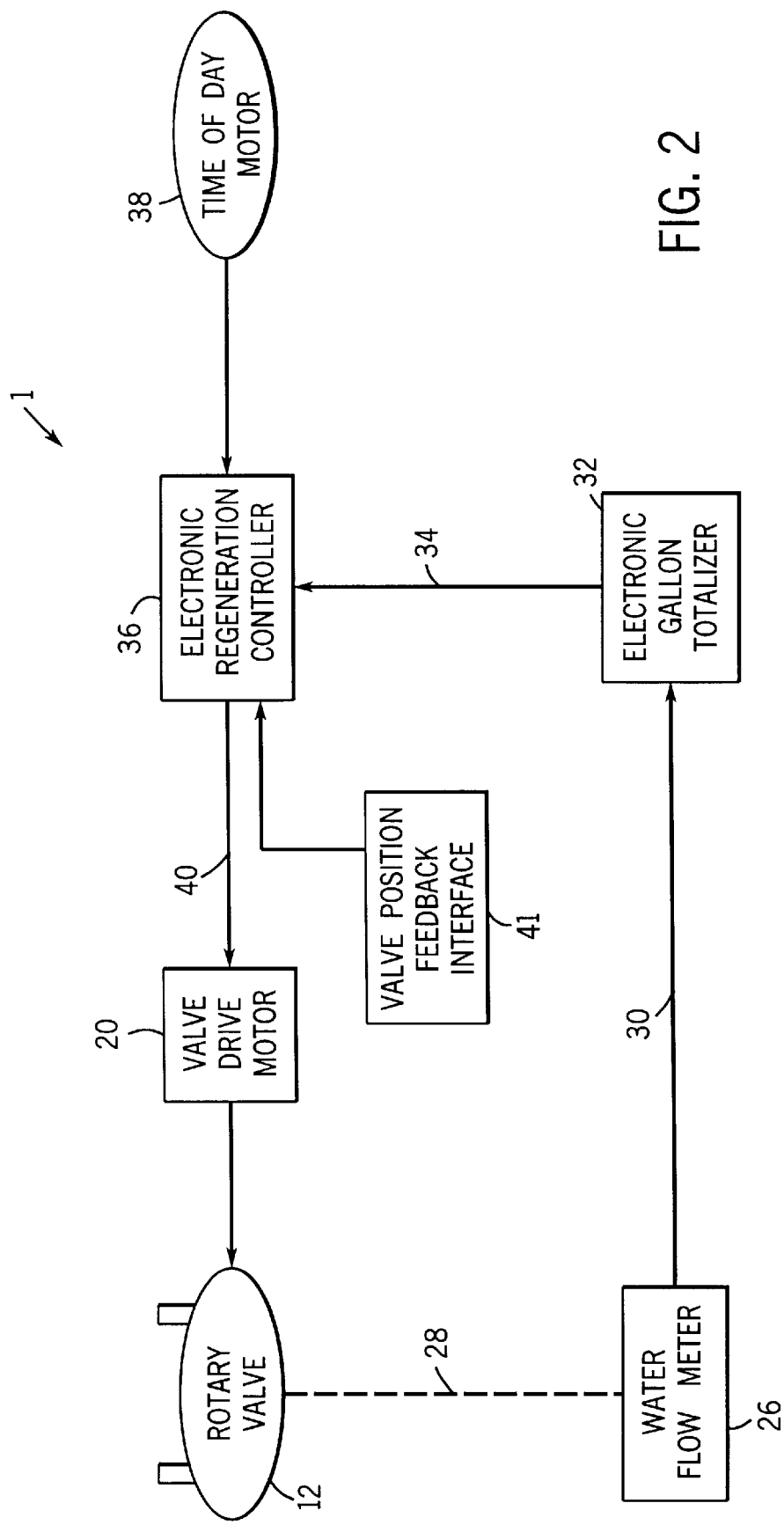
FIG. 2 is a flowchart illustrating operation of a first embodiment of the invention implementing a demand regeneration scheme with an electromechanical regeneration controller.

FIG. 2 is a schematic drawing illustrating a valve position control system 1 in accordance with the first embodiment of the invention. The system 1 implements a demand regeneration scheme in which a regeneration cycle begins automatically at a predetermined time of day, such as 2:00 AM, after water usage as measured by a flow meter 26 exceeds a preset limit. In FIG. 2, dashed line 28 indicates that the water flow meter 26 measures water flowing through the rotary valve 12. The preferred water flow meter 26 is a turbine module. The water flow meter 26 outputs a water flow signal in line 30. The water flow signal in line 30 is typically a frequency signal if the water flow meter 26 is a turbine module. The water flow signal in line 30 inputs an electronic gallon totalizer 32. The electronic gallon totalizer 32 outputs a cumulative water usage signal in line 34. The cumulative water usage signal is preferably an analog signal. The cumulative water usage signal in line 34 inputs an electronic regeneration controller 36. When the electronic regeneration controller 36 determines that the cumulative water usage signal in line 34 exceeds a water usage set point for the system, the electronic regeneration controller 36 internally generates a regeneration ready signal to indicate that the water conditioning system is ready for a regeneration cycle. The system 1 also includes a mechanical clock 38, such as a time-of-day motor. The mechanical clock 38 actuates a mechanical electric switch 102 (see FIG. 3) at a settable time of day, such as 2:00 AM. The settable time of day should be selected to be a convenient time of day to regenerate. The electronic regeneration controller 36 begins a regeneration cycle when a regeneration ready signal is present to indicate that the water conditioning system is ready for a regeneration cycle and the mechanical clock 38 actuates the mechanical electrical switch. The electronic regeneration controller 36 outputs a motor control signal in line 40 in accordance with the regeneration cycle. The valve drive motor 20 inputs the motor control signal from the electronic regeneration controller 36, and positions the rotary valve 12 in accordance with the motor control signal. A valve position feedback interface 41 provides input to the electronic regeneration controller 36 indicative of the position of the valve. After a dwell time corresponding to the position of the valve, the electronic controller outputs a signal to move the valve to the next position in the regeneration cycle. An electromechanical control unit 18 in accordance with the first embodiment 1 of the invention is illustrated in FIGS. 3–10.

Figure 3:
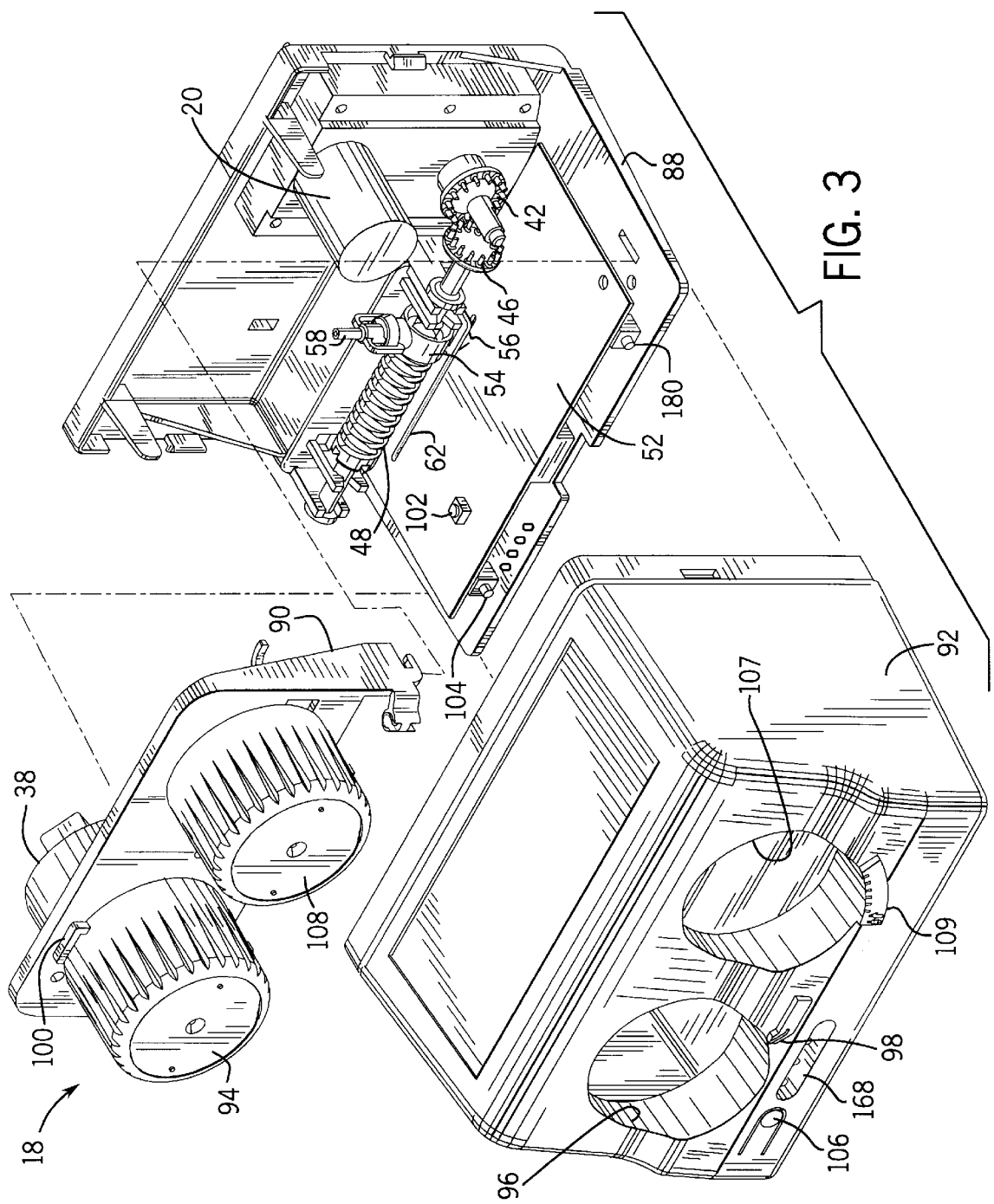
FIG. 3 is an exploded perspective view of the first embodiment of the invention.
Figure 4:
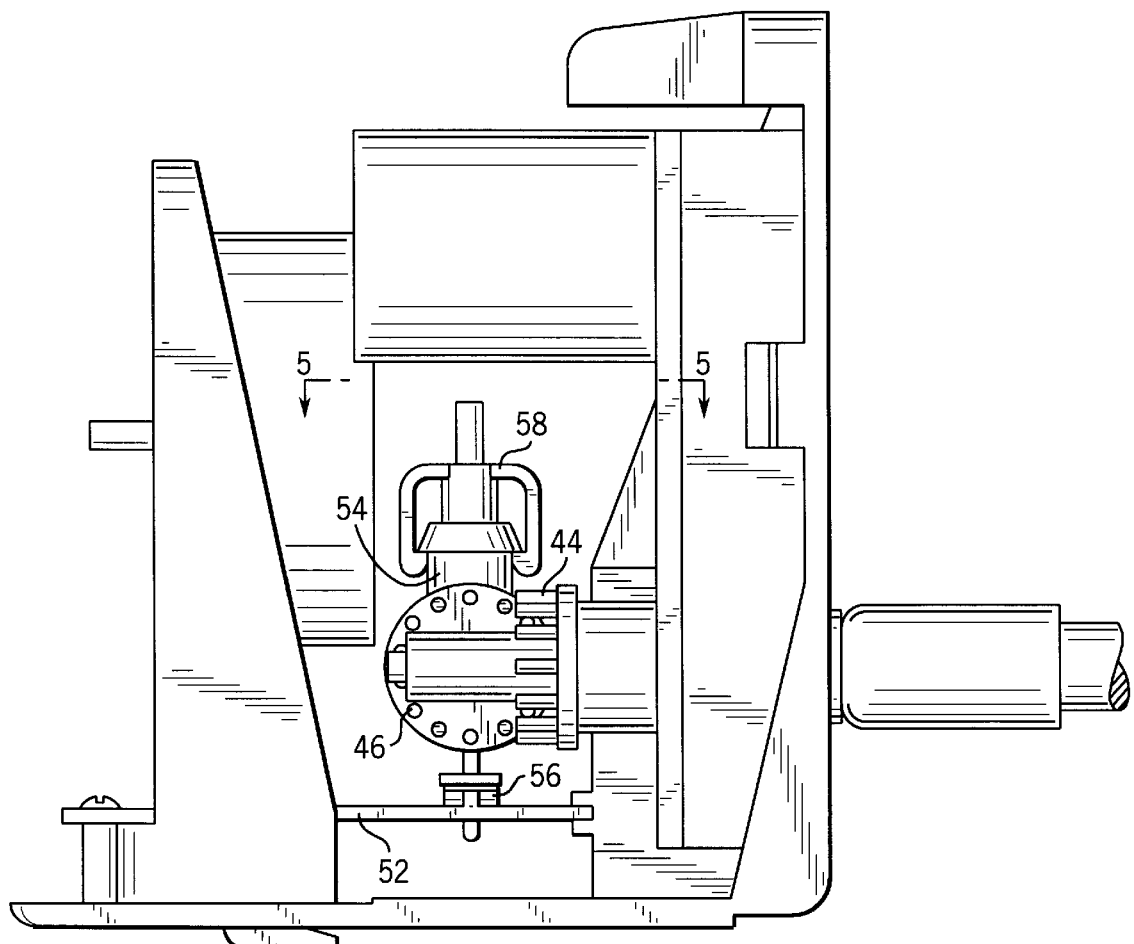
FIG. 4 is a side elevational view illustrating mechanical components of a control unit in accordance with the invention.
Figure 5:
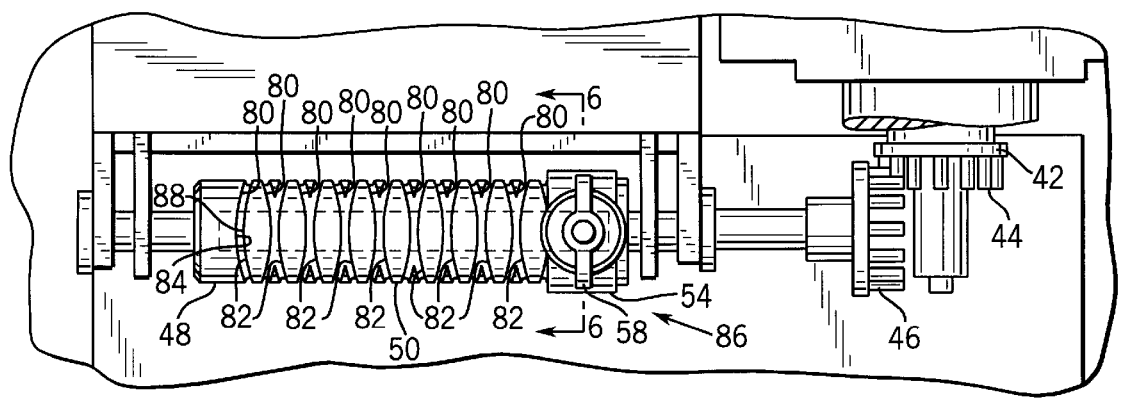
FIG. 5 is a top view taken along lines 5—5 in FIG. 4.
Figure 6:
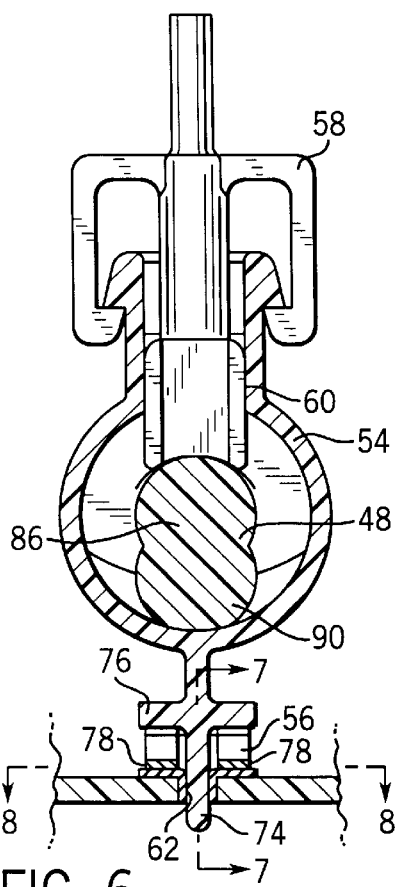
FIG. 6 is a sectional view taken along lines 6—6 in FIG. 5.
Figure 7:
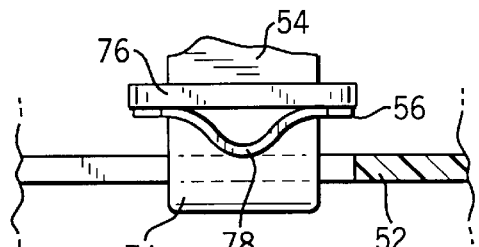
FIG. 7 is a sectional view taken along lines 7—7 in FIG. 6.

Referring to FIGS. 3–5, the control unit 18 has a drive motor 20 that drives drive shaft 22 (FIG. 1), and spoke gear 42 contemporaneously. The drive shaft 22 (FIG. 1) is preferably made of nylon with 43% glass as is known in the art. In the preferred embodiment, the spoke gear 42 is also made of nylon. The spoke gear 42 has 8 equally spaced spokes. The spoke gear 42 drives a valve position slide switch that preferably uses a dual lead screw 48. The dual lead screw configuration is an inexpensive way to provide an effective and durable valve position feedback interface mechanism. The dual lead screw configuration provides a full-circle, closed-loop, unidirectional feedback mechanism without using conventional mechanical logic switching systems, such as cams or the like.

The spokes 44 on the spoke gear 42 engage spokes 46 of the dual lead screw 48. The dual lead screw 48 is preferably made of nylon. The preferred total length of the dual lead screw 48 is about 5 inches. The dual lead screw 48 has a threaded portion 50 having a length of about 2 inches. The spokes 46 on the dual lead screw 48 are coaxial with the axis of rotation of the dual lead screw 48. The dual lead screw 48 is supported for rotation horizontally above a printed circuit board 52, and is perpendicular to the spoke gear 42 driven by the drive motor 20. The spokes 46 on the dual lead screw 48 engage the spoke gear 42 driven by the drive motor 20, so that the drive motor 20 causes the dual lead screw 48 to rotate whenever the motor 20 causes the drive shaft 22 to operate the valve 12.

The threaded portion 50 of the dual lead screw 48 includes threads in both the forward direction and the reverse direction. Referring now to FIGS. 4–7, a movable carriage 54 is located coaxially around the threaded portion 50 of the dual lead screw 48. The movable carriage 54 carries an electrical contactor 56. A follower 58 is snapped onto the movable carriage 54. The follower 58 has an indexing member 60 (FIG. 6) that resides at least in part within the threads 50 of the dual lead screw 48. The indexing member 60 is a generally flat plate having a width slightly smaller than the width of the space between the threads 50 of the dual lead screw 48. The follower 58 is rotatably coupled to the carriage 54 such that the follower 58 can rotate perpendicularly to the dual lead screw 48, thus allowing the indexing member 60 on the follower 58 to position itself for moving through both the forward and the reverse threads on the dual lead screw 48.

Figure 8:
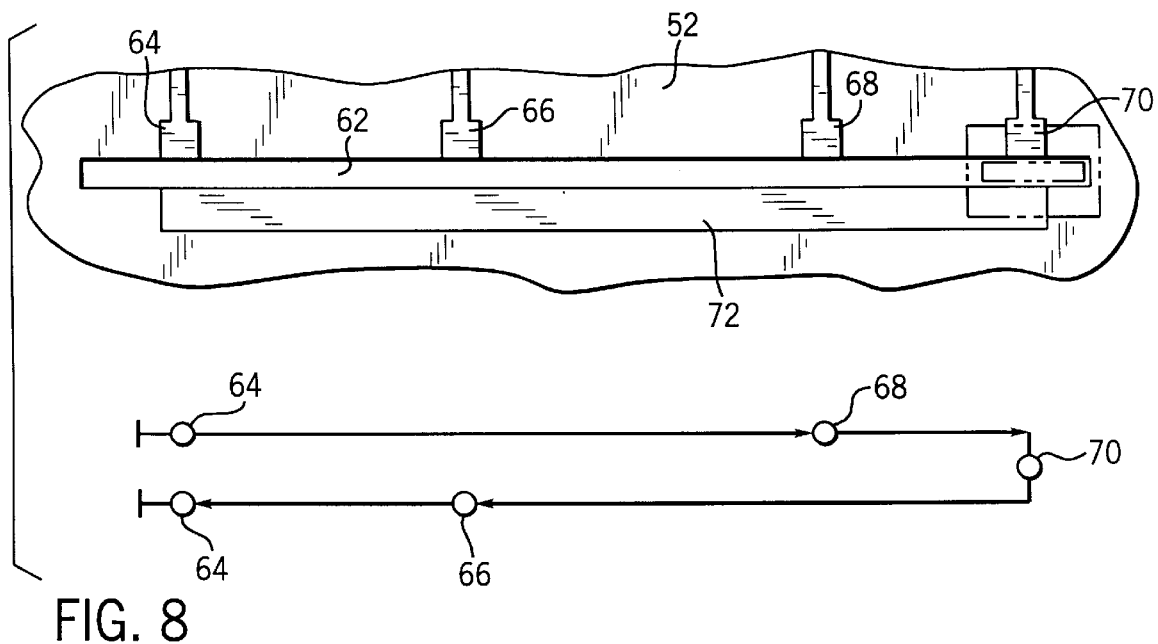
FIG. 8 shows a top plan view of a series of discrete electrical contacts spaced physically along a path on a board, and a schematic view illustrating how the series of electrical contacts provides a closed control loop.

Referring to FIG. 8, the circuit board 52 has a straight slot 62 having a length corresponding generally to the length of the threaded portion 50 of the dual lead screw 48. The slot 62 defines a physical path along the board 52. A series of discrete electrical contacts 64, 66, 68 and 70 are provided along the path defined by the slot 62. In a preferred embodiment, a continuous electrical conductor 72 is provided adjacent the slot 62 on the side of the slot 62 opposite the discrete electrical contacts 64, 66, 68 and 70.

Referring again to FIGS. 6 and 7, the movable carriage 54 has a downwardly extending guide member 74 that is received within slot 62. The electrical contactor 56 on the movable carriage 54 is attached to a platform 76 extending horizontally across the guide member 74. Preferably, the platform 76 also extends longitudinally beyond the guide member 74. The electrical contactor 56 has lower portions 78 disposed to make contact with the board 52 on each side of the slot 62. The sides of the electrical contactor 56 are electrically connected to each other by a transverse conductor across the platform 76, preferably in the portion of the platform 76 that extends longitudinally beyond the guide member 74.

In general, the discrete electrical contacts 64, 66, 68 and 70 along the slot 62 each correspond to an event or mode occurring during operation of the water conditioning system 10. For instance, when the rotary valve 14 (FIG. 1) is positioned for the service mode, the movable carriage 54 will be positioned so that the electrical contactor 56 makes an electrical connection between the continuous conductor 72 and the discrete electrical contact labeled 64. The movable carriage 54 remains stationary during the service cycle so that the electrical contactor 56 maintains the connection between the continuous conductor 72 and the service contact 64 during the service cycle. When the control unit 18 is triggered to begin the regeneration cycle, as is discussed below, the drive motor 20 rotates the valve 14 into a backwash position, and also at the same time turns the dual lead screw 48 to actuate the slide switch. As the dual lead screw 48 turns, the threads 50 push against the indexing member 60 of the follower 58 to drive the movable carriage 54 along the slot 62 towards a backwash mode electrical contact labeled 68. As the movable carriage 54 is driven along slot 62 at the start of the backwash mode, the carriage 54 passes the electrical contact labeled 66 and stops at the electrical contact labeled 68. The distance between the service mode electrical contact 64 and the backwash mode electrical contact 68 along the slot 62 corresponds to the amount that the drive motor 20 rotates the valve drive shaft 22 to rotate the valve 12 from service mode to backwash mode. When the backwash cycle is complete, the drive motor 20 rotates the valve drive shaft 22 to rotate the valve 12 into the brine/slow rinse mode. Contemporaneously, the drive motor 20 rotates the dual drive screw 48 to move the carriage 54 from the backwash mode electrical contact 68 to the brine/slow rinse mode electrical contact 70. When the brine/slow rinse cycle is complete, the drive motor 20 turns the valve drive shaft 22 to rotate the valve 12 into a fast rinse/brine refill mode. Contemporaneously, the drive motor 20 rotates the dual lead screw 48 to move the carriage 54 from the brine/slow rinse mode electrical contact 70 back to the fast rinse/brine refill mode electrical contact 66. When the fast rinse/brine refill cycle is complete, the drive motor 20 rotates the valve drive shaft 20 to put the valve 12 in the service mode. Contemporaneously, the drive motor 20 rotates the dual lead screw 48 to push the movable carriage 54 to the service mode electrical contact 64.

Referring now in particular to FIG. 5, the threaded portion 50 of the dual lead screw 48 has forward threads designated by reference numeral 80 that push the indexing member 60 of the follower 58 to move the carriage 54 from left to right in FIG. 5 as the dual lead screw 48 rotates clockwise. The threaded portion 50 of the dual lead screw 48 also includes reverse threads designated by reference numeral 82 which push the indexing member 60 of the follower 58 to drive the carriage 54 from right to left in FIG. 5 when the dual lead screw 48 rotates clockwise. The threaded portion 50 of the dual lead screw 48 has a first end 84 corresponding to the position of the service mode electrical contact 64 and a second end 86 corresponding to the position of the brine/slow rinse mode electrical contact 70. The second end 86 is shown to be generally in the vicinity of arrow 86 and shown specifically in FIG. 6, which is a sectional view through the second end 86). Both the first end 84 and the second end 86 of the threaded portion 50 on the dual lead screw 48 have a flat portion 88, 90 respectively. The purpose of the flat portions 88 and 90 is to allow clearance for the indexing member 60 on the follower 58 as the dual lead screw 48 turns when the indexing member 60 passes from the forward threads 80 to the reverse threads 82, and vice versa.

Referring again to FIG. 3, the control unit 18 has a housing member 88. The drive motor 20, the drive shaft 22, and the valve position slide switch (i.e., the spoke gear 42, the dual lead screw control mechanism 46, 48, 50, 52, 54, 56, 58, and the slot 62 in the circuit board 52 with adjacent electrical contacts 64, 66, 68, 70 and 72), are mounted to a housing member 88. A front plate 90 is also mounted to the housing member 88. A front cover 92 is snap engaged over the front plate 90 to enclose the housing member 88.

A mechanical clock 38 (e.g. a time-of-day motor) and a timer control knob 94 are mounted to the front plate 90. The timer control knob 94 is mounted to the front side of the front plate 90 and is coupled through the front plate 90 to the mechanical clock 38. The mechanical clock 38 is preferably a small electric motor having a drive shaft with a constant revolution rate of 1:1440 RPM (i.e. one revolution per day). When the control unit 18 is assembled, the timer control knob 94 extends through an opening 96 in the cover 92. Although not shown in the drawings, the face of the timer control knob 94 preferably has a visible 24 hour clock face. In order to set the control unit 18 so that the unit 18 will trigger regeneration cycles at 2:00 AM (or some other preferred regeneration time), the user turns the timer knob 94 so that arrow 98 located on the front cover 92 aligns with a time on the front face of the timer control knob 94 which is synchronized with the actual time of the day. The timer control knob 94 has a trigger finger 100 extending outward from the knob 94 to actuate a mechanical electric switch 102 each time the timer control knob 94 makes a complete revolution. It is preferred that the trigger finger 100 actuate the electric switch 102 at 2:00 AM. A manual regeneration button 104 can also be activated by pushing on button location 106 on the front cover 92.

Figure 10:
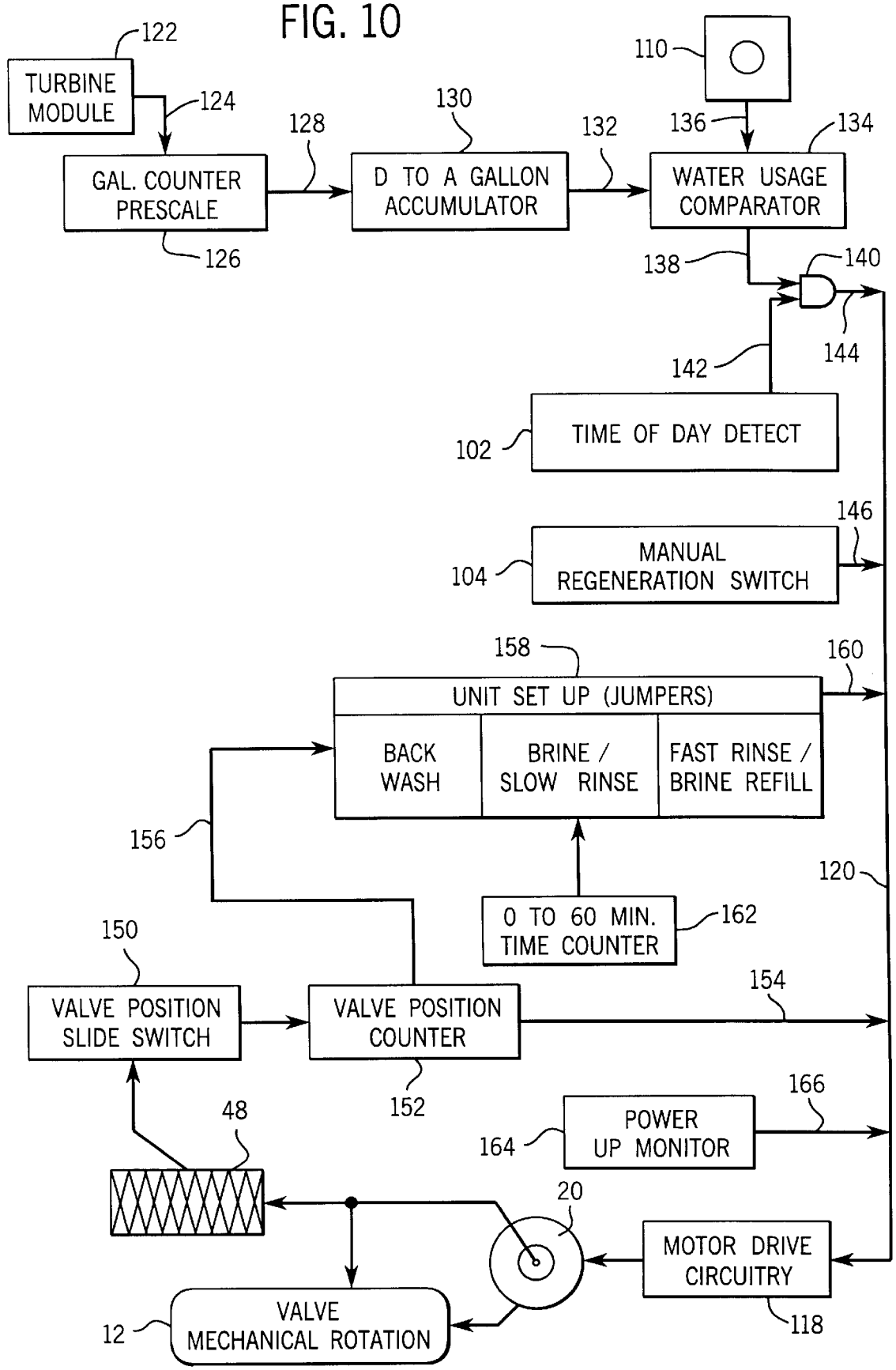
FIG. 10 is an electromechanical flowchart depicting operation of the system shown in FIGS. 2–9.

The control unit 18 shown in FIG. 3 also includes a demand control knob 108 that is mounted to the front plate 90. The demand control knob 108 can be turned to adjust the resistance of an adjustable potentiometer 110 (FIG. 10). Rotating demand control knob 108 adjusts the potentiometer 110 to adjust the water usage set point for the system. The start of the regeneration cycle is triggered at the selected predetermined time (e.g. 2:00 AM) after water usage as measured by a flow meter exceeds the water usage set point.

It is preferred that the face of the demand control knob 108 have labels corresponding to the desired maximum hardness of conditioned water that is suitable for the application. The demand control knob 108 passes through opening 107 in the front of the cover 92. A person can adjust the potentiometer 110 (FIG. 10) to an appropriate setting by lining up a desired water hardness value as indicated on the front face of the demand control knob 108 with a number of people scale 109 located on the front face of the cover adjacent the opening 107. The number of people scale 109 includes a plurality of marks, each corresponding to the number of people that are expected to reside in the residence. In this manner, the control system 18 automatically accounts for the amount of water typically used per person so that the hardness of treated water will probably not exceed a desired limit before a regeneration cycle is triggered by the next passage of 2:00 AM.

FIG. 9 shows a group of three sets of electrical jumper connections 112, 114 and 116 which are preferably used to set the dwell times in each of the various modes of the regeneration cycle. The group of three sets of jumper connections 112, 114 and 116 communicates with the regeneration timing program shown in FIG. 10. Jumper connection set 112 is a backwash jumper connection set indicating that the control unit 18 can be programmed so that the backwash mode of the regeneration cycle has a dwell period of 5, 10, 15, or 20 minutes. An electrical jumper can be placed across any one of these jumper connections to select the appropriate duration of the backwash mode of the regeneration cycle. Likewise, the duration of the fast rinse/ brine refill mode of the regeneration cycle can be programmed by placing an electrical jumper across a jumper connection in the set 114. The brine/slow rinse mode of the regeneration cycle can be programmed for a brine/slow rinse cycle of 0, 30, 45 or 60 minutes. Also, the duration of the fast rinse/brine refill mode can be programmed for 0, 6, 8 or 10 minutes by placing a jumper across a jumper connection in set 116. The group of jumper connections 112, 114 and 116 are preferably mounted on the circuit board 52. This system of using jumper connections to program the duration of the various modes of the regeneration cycle provides a practical way for technicians to customize the control unit 18 for the specific application.

FIG. 10 illustrates the preferred electromechanical control scheme for the control unit 18 shown in FIGS. 2–9. In FIG. 10, motor drive circuitry 118 receives digital control information through data line 120, and outputs a control signal that controls the drive motor 20.

When the system is in service mode, a flow meter or turbine module 122 monitors the amount of water flowing into or out of the mineral tank 14 and transmits a flow signal in line 124 to a gallon counter prescale/divider 126. The flow signal in line 124 from the turbine module 122 is preferably a frequency signal. The gallon counter prescale/divider 126 converts the frequency signal into a digital flow signal that is transmitted through line 128 to a digital to analog gallon accumulator 130. The digital to analog accumulator 130 transmits an analog cumulative water usage signal in line 132 to a water usage comparator 134. The water usage comparator 134 compares the value of the cumulative water usage signal in line 132 to the value of an analog set point signal from the adjustable potentiometer 110 in line 136. If the analog cumulative water usage signal in line 132 exceeds the analog set point signal in line 136, a logic high signal is output in line 138 and transmitted to a logical "AND" gate 140. The logical "AND" gate 140 also receives a logic high signal from the time-of-day electrical switch 102 through line 142 when the electrical switch 102 is actuated by the trigger finger 100 on the timer control knob 94. When the logical "AND" gate 140 receives a logic high signal in line 138 from the water usage comparator and a logic high signal in line 142 from the time-of-day electrical switch 102, the logical "AND" gate 140 outputs a logic high signal in line 144. The logic high signal in line 144 is transmitted to the motor drive circuitry 118 via data bus 120 to automatically trigger the beginning of a regeneration cycle.

Alternatively, a user can manually push button location 106 on the front cover 92 to depress manual regeneration switch 104 to generate a logic high signal in line 146 to manually trigger the start of the regeneration cycle. Actuating the manual regeneration switch 104 can also generate a signal to manually step the unit through a regeneration cycle.

Once the start of the regeneration cycle is triggered, the motor drive circuitry 118 instructs the drive motor 20 to rotate the valve 12 via drive shaft 22. The drive motor 20 contemporaneously rotates the dual lead screw 48. As the dual lead screw 48 rotates, the electrical contactor 56 moves along the slot 62 in the circuit board 52. Block 150 labeled "VALVE POSITION SLIDE SWITCH" represents that each time the electrical contactor 56 moves to the next discrete electrical contact 64, 68, 70 and 66, a corresponding signal is transmitted to a valve position counter 152. The valve position counter 152 outputs a valve position signal in line 154 indicating the location of the electrical contactor 56 in the valve position slide switch. The valve position signal in line 154 is important because it determines the amount the motor 20 should rotate. The valve position counter 152 also outputs a signal in line 156 to a regeneration timing program illustrated by block 158.

Once the start of the regeneration cycle is triggered, the regeneration timing program 158 outputs a signal in line 160 that controls the operation of the system in accordance with a preset timing scheme that defines the dwell periods for each of the modes in the regeneration cycle (i.e. backwash mode, brine/slow rinse mode, and fast rinse/brine refill mode). In particular, a minute counter 162 communicates with the regeneration timing program 158. The regeneration timing program 158 is programmed using jumpers as discussed in accordance with FIG. 9 illustrated by block 136. When the minute counter 162 counts the number of minutes corresponding to the dwell time for the corresponding mode in the regeneration cycle, the regeneration timing program 158 outputs a signal in line 160 to the data line 120 indicating that the duration of that mode of the regeneration cycle has run its course. When the motor drive circuitry 118 receives such a signal from the regeneration timing program 158, the motor drive circuitry 118 instructs the drive motor 20 to advance to the next mode of the cycle in accordance with the valve position signal from line 154.

Block 164 outputs a reset signal in line 166 when the control unit 18 powers up, thereby resetting the position of the valve position slide switch to the service position, and also resetting the D to A gallon accumulator 130 and the motor drive circuitry 118.

Referring again to FIG. 3, the front cover 92 also has indicator lights 168 that give an indication of whether there is power available to the unit 18, and if so, which mode of operation the system is operating (i.e. service cycle, or one of the various modes of the regeneration cycle).

Figure 11:
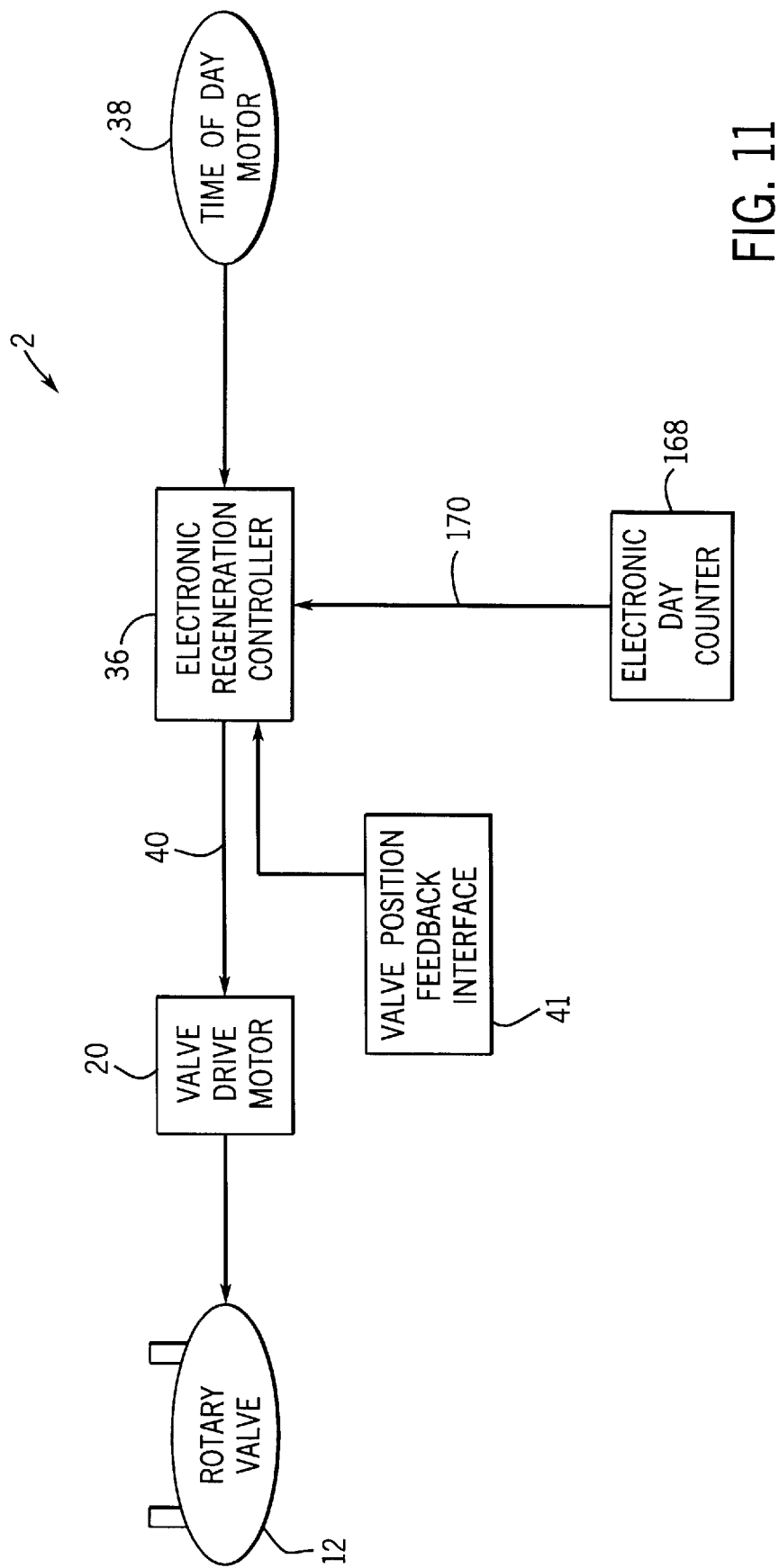
FIG. 11 is a flowchart illustrating operation of a second embodiment of the invention implementing a day-of-week or day internal regeneration scheme with an electromechanical regeneration controller.

FIG. 11 is a schematic illustration of a valve position control system 2 in accordance with a second embodiment of the invention. The system 2 in FIG. 11 implements either a day-of-week regeneration scheme or a day interval regeneration scheme rather than a demand regeneration scheme as discussed in accordance with FIGS. 2–10. FIG. 11 is similar in many respects to FIG. 2, and like reference numerals are used where appropriate to facilitate understanding. In FIG. 11, an electronic day counter 168 counts the number of days that have passed since system start-up or reset, or since the previous regeneration cycle. The electronic day counter 168 outputs a signal in line 170 indicating the number of days that have passed. The electronic regeneration controller 36 receives a signal in line 170 and internally generates a regeneration ready signal to indicate that the water conditioning system is ready for a regeneration cycle when the signal 170 reaches a value programmed into the electronic regeneration controller 36. The value programmed into the electronic regeneration controller 36 can depend on either a day-ofweek scheme, or a day interval scheme. The system 2 also has a mechanical clock, such as a time-of-day motor 38, that actuates a mechanical electric switch at a settable time of day, such as 2:00 AM. The electronic regeneration controller 36 begins a regeneration cycle when the electronic regeneration controller has internally generated a regeneration ready signal to indicate that the water conditioning system is ready for a regeneration cycle and the mechanical clock 38 actuates the mechanical switch. The electronic regeneration controller 36 outputs motor control signals in line 40 in accordance with the regeneration cycle. The valve drive motor 20 inputs the motor control signals in line 40, and positions the rotary valve 12 in accordance with the motor control signals.

An electromechanical control unit 172 in accordance with the second embodiment 2 of the invention is shown in FIG.

12. The control unit 172 shown in FIG. 12 has many similar components to the control unit 18 shown in FIGS. 2–10, except the control unit 172 shown in FIG. 12 implements either a day of the week regeneration scheme or a day interval regeneration scheme rather than a demand regeneration scheme. In particular, the valve position slide switch is preferably the same in both control units 18 (FIG. 3) and 172 (FIG. 12).

Referring to FIG. 12, the control unit 172 has a set of seven dip switches 174 each representing a day of the week. A cover 92a for the control unit 172 includes a removable snap-on element 176 that can provide easy access to the dip switches 174 when the unit 172 is assembled. The unit 172 also includes a set of day of the week LED indicator lights 178. Program Day push button 180 can be actuated by pressing on button location 182 on the front face of cover 92a to sequentially step the control unit 172 through the days of the week so that the set of LED lights 178 indicates the proper day of the week.

Referring to FIG. 13, a set of jumper connections 184 is provided in addition to jumper connection sets 112, 114 and 116, for the purpose of selecting between a day interval regeneration scheme (jumper connection 184a), and a day of the week regeneration scheme (jumper connections 184b).

Figure 14:
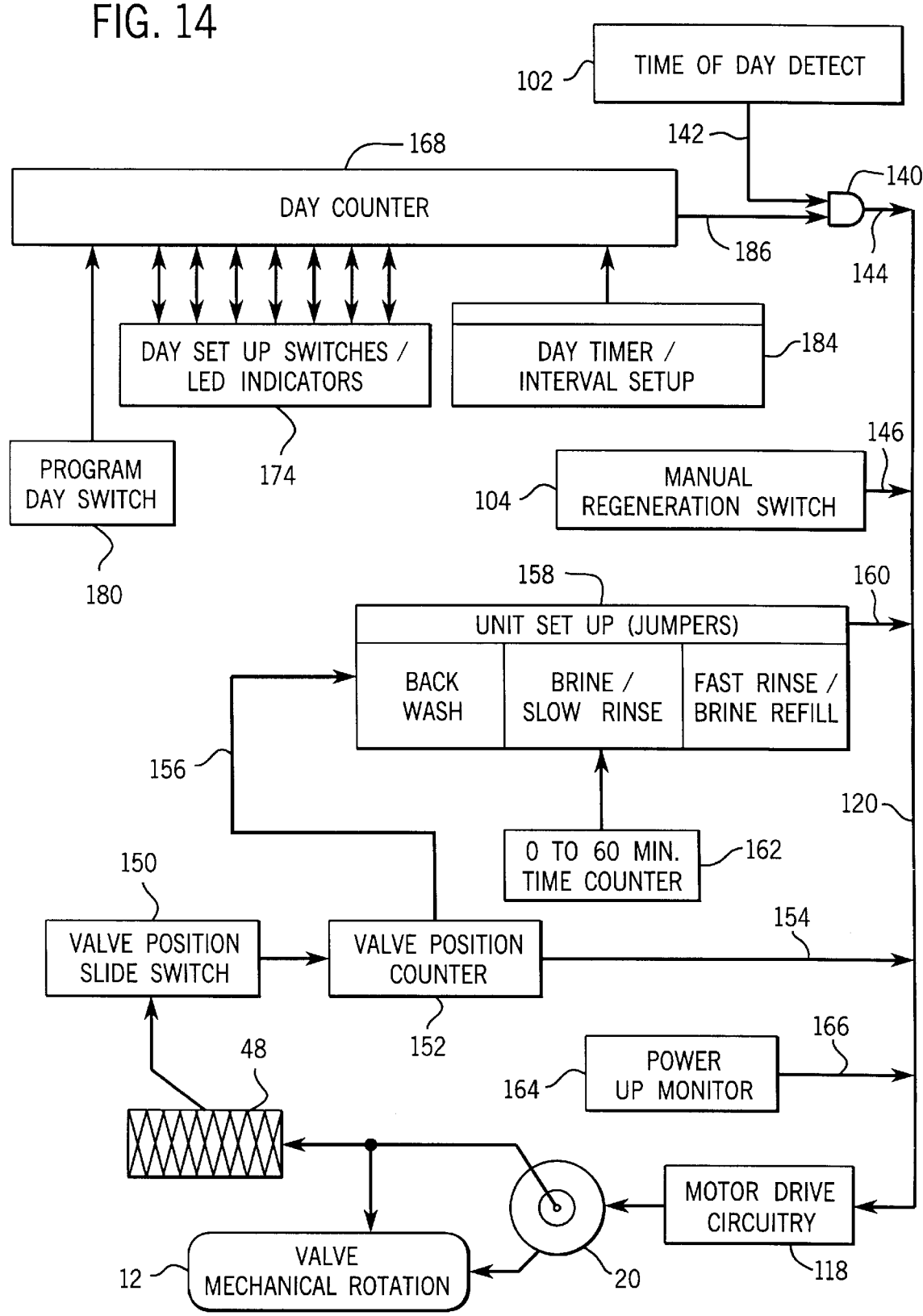
FIG. 14 is an electromechanical flowchart describing the operation of the embodiment of the invention shown in FIGS. 11–13.

FIG. 14 illustrates the electromechanical control scheme for the control unit 172 shown in FIGS. 11–13. Referring to FIG. 14, a day counter 168 is programmed in accordance to the setting of the dip switches 174, the jumper location on the jumper connections 184, and in accordance with the program day switch 180. If an electrical jumper provides a connection across the interval jumper connection 184a, the day counter 168 will output a regeneration ready signal in line 186 (e.g., a logic high signal in line 186) when the count in the day counter 168 reaches the number of days represented by the first positively set dip switch 174. In an interval scheme, the day counter 168 will then reset to 0. If an electrical jumper provides a connection across the day-of-week jumper connections 184b, the day counter 168 will output a regeneration ready signal in line 186 when the count in the day counter 168 reaches the number of days represented by the first positively set dip switch 174, but the day counter 168 does not reset when reaching the first positively set dip switch 174. Rather, in a day-of-the-week scheme, the day counter 168 continues to count, and outputs another regeneration ready signal in line 186 upon reaching the number of days represented by the next positively set dip switch 174. In the day-of-the-week scheme (i.e. jumper selection 164b), the day counter 108 does not reset to the first day of the week until the entire previous week is completed.

When the logical "AND" gate 140 receives a regeneration ready signal (e.g., a logic high signal) in line 186 from the day counter 168 and a logic high switch in line 142 from the time-of-day electrical switch 102, the logical "AND" gate 140 outputs a logic high signal in line 144. The logic high signal in line 144 is transmitted to the motor drive circuitry 118 via data bus 120 to automatically trigger the beginning of a regeneration cycle as discussed previously in conjunction with FIG. 10. Other aspects of the electromechanical control scheme shown in FIG. 14 preferably operate in the same manner as the electromechanical control scheme shown in FIG. 10.

Figure 15:
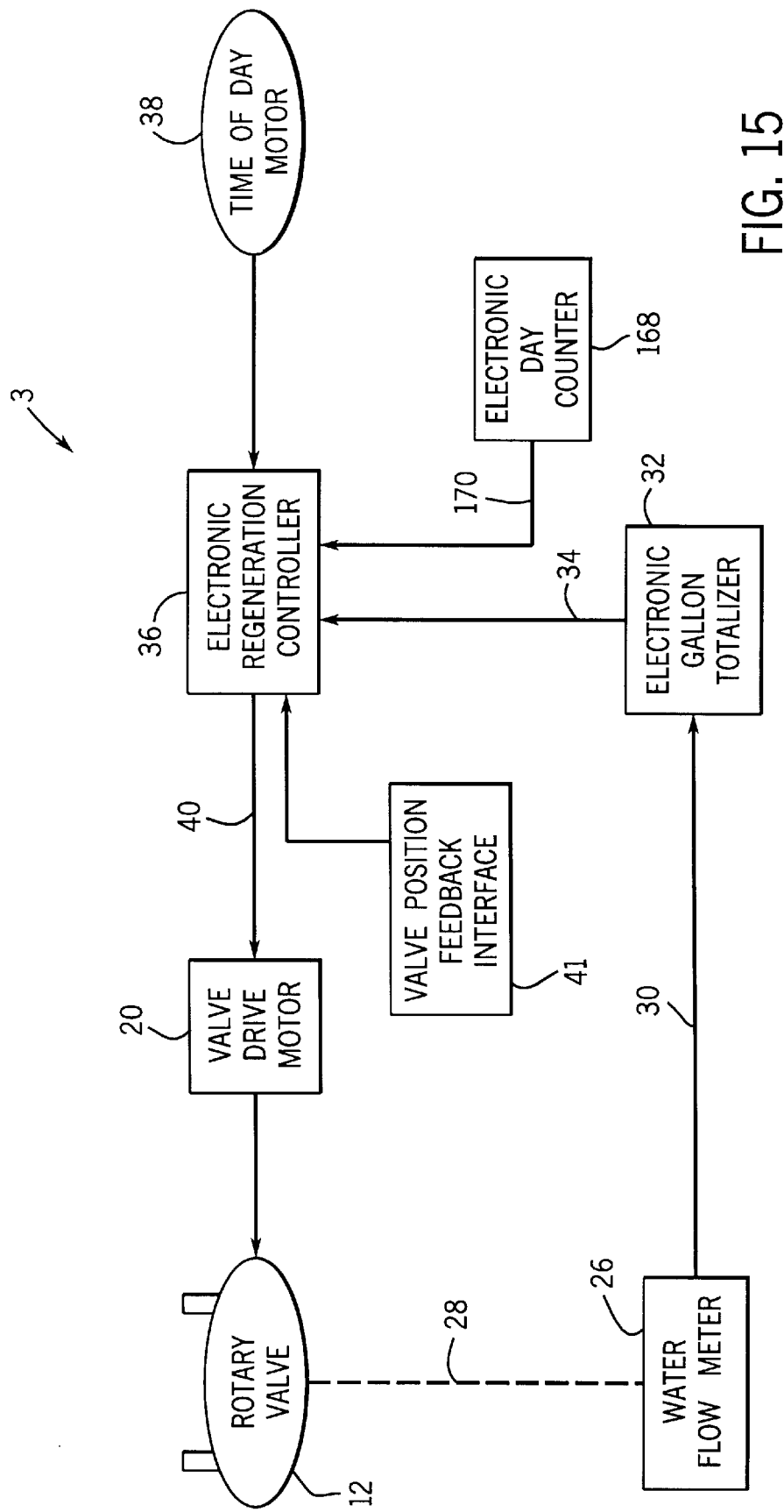
FIG. 15 is a flowchart illustration operation of a third embodiment of the invention implementing a demand/day override regeneration scheme with an electromechanical regeneration controller.

FIG. 15 illustrates a third embodiment 3 of the invention implementing a demand regeneration scheme having a day override. The system 3 in FIG. 15 is similar in many respects to the system 1 shown in FIG. 2, except system 3 in FIG. 15 includes an electronic day counter 168 in addition to the water flow meter 26 and the electronic gallon totalizer 32. As in system 1 shown in FIG. 2, the electronic gallon totalizer 32 of the system 3 shown in FIG. 15 outputs a cumulative flow signal in line 34 that inputs the electronic regeneration controller 36. The electronic regeneration controller 36 in the system 3 of FIG. 15, however, also inputs a signal from the electronic day counter 168 through line 170. In the event that the cumulative water usage signal in line 32 does not exceed the water usage set point in the electronic regeneration controller 36 within a predetermined number of days, the electronic regeneration controller 36 nonetheless generates a regeneration ready signal so that a regeneration cycle will be triggered when the mechanical clock 38 actuates the mechanical electric switch 102 at the settable time of day (for example 2:00 AM) on the following day.

Figure 16:
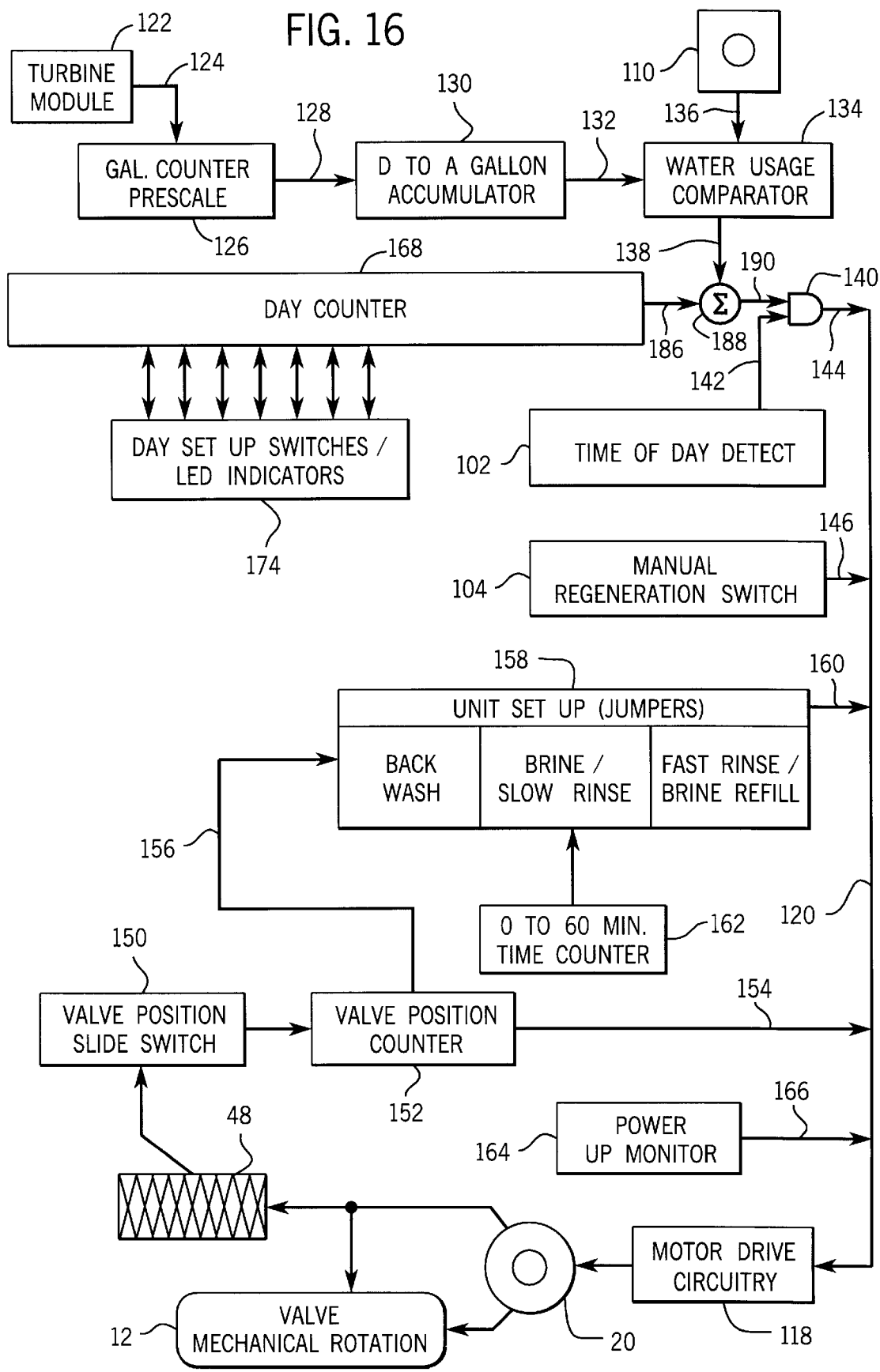
FIG. 16 is an electromechanical flowchart describing the operation of the embodiment of the invention shown in FIG. 15.

FIG. 16 illustrates the preferred electromechanical control scheme for the system 3 shown in FIG. 15 which has a demand regeneration scheme with day override. In many respects, the electromechanical control scheme shown in FIG. 16 is similar to the electromechanical control scheme shown in FIG. 10 for the system 1 implementing a demand regeneration scheme without day override. The primary difference involves the addition of the day counter 168 and the summing junction 188. More specifically, if the analog cumulative water usage signal in line 132 exceeds the analog set point in line 136 from the adjustable potentiometer 110, a logic high signal is output in line 138 to summing junction 188. Likewise, the day counter 168 will output a logic high signal in line 186 when the count in the day counter 168 reaches the number of days represented by the first positively set dip switch 174. If the summing junction 188 inputs a logic high signal in either line 138 from the water usage comparator 134 or line 186 from the day counter 168, the summing junction 188 outputs a logic high regeneration ready signal in line 190 that is transmitted to the logical "AND" gate 140. When the logical "AND" gate 140 receives a logic high signal in line 190 from the summing junction 188 and a logic high signal in line 142 from the time-of-day electrical switch 102, the logical "AND" gate 140 outputs a logic high signal in line 144. As described in FIGS. 10 and 14, the logic high signal in line 144 is transmitted to the motor drive circuitry 118 via data bus 120 to automatically trigger the beginning of the regeneration cycle. Other aspects of the electromechanical control scheme shown in FIG. 16 are preferably similar to the electromechanical control scheme shown in FIGS. 10 and 14.

While the invention has been described in accordance with three preferred embodiments, it should be apparent to those skilled in the art that these embodiments are merely examples of the invention. Modifications, alternatives and equivalents to these exemplary embodiments should be considered to be within the scope of the following claims.

We claim:

1. In a water conditioning system having a mineral tank containing a bed of an ion exchange resin, a brine tank, and a valve for directing fluid flow into and from the mineral tank, a valve position control system comprising:

a mechanical electric switch;

a mechanical clock that actuates the mechanical electric switch at a settable time of day;

means for generating a regeneration ready signal to indicate that the water conditioning system is ready for a regeneration cycle;

an electronic regeneration controller that begins a regeneration cycle when the regeneration ready signal indicates that the water conditioning system is ready for a regeneration cycle and the mechanical clock actuates the mechanical electric switch;

a drive motor that positions a valve; and a feedback interface mechanism for providing inputs to the electronic regeneration controller indicative of the position of the valve.

2. A valve position control system as recited in claim 1 wherein the feedback interface mechanism is electromechanical.

3. A valve position control system as recited in claim 1 wherein the feedback interface mechanism includes:

a board having a series of electrical contacts spaced physically along a path on the board;

a dual lead screw that is driven by the drive motor to turn threads on the dual lead screw; and a movable carriage carrying an electrical contactor along the path on the board, wherein movement of the carriage is driven by turning the threads of the dual lead screw.

4. A valve position control system as recited in claim 1 further comprising a group of three sets of electrical jumper connections that can be positioned to program dwell times in the electronic regeneration controller, the group including a set of backwash jumper connections, a set of brine/slow rinse jumper connections, and a set of fast rinse/brine refill jumper connections.

5. A valve position control system as recited in claim 1 wherein the means for generating a regeneration ready signal comprises:

a water flow meter system outputting a cumulative water usage signal; and a water usage comparator that receives the cumulative water usage signal and outputs a regeneration ready signal when the cumulative water usage signal reaches a water usage set point value.

6. The valve position control system as recited in claim 5 wherein the water usage set point value can be adjusted using an adjustable potentiometer.

7. The valve position control system as recited in claim 5 wherein the means for generating the regeneration ready signal further comprises:

a day counter outputting a regeneration ready signal when a day count within the day counter reaches a preselected maximum value.

8. A valve position control system as recited in claim 1 wherein the means for generating the regeneration ready signal comprises:

a day counter that outputs a regeneration ready signal when a day count within the day counter reaches a preselected value.

9. The valve position control system as recited in claim 8 wherein the day counter implements a day-of-the-week regeneration control scheme.

10. A valve position control system as recited in claim 8 wherein the day counter implements a day interval regeneration control scheme.

11. In a water conditioning system having a mineral tank containing a bed of an ion exchange resin, a brine tank, and a valve for directing fluid flow into and from the mineral tank, a method of controlling operation of the valve for the regeneration of the ion exchange resin, the method comprising the steps of:

generating a regeneration ready signal to indicate that the water conditioning system is ready for a regeneration cycle;

actuating a mechanical switch at a settable time of day in response to motion of a mechanical clock;

electronically generating a first motor control signal after the regeneration ready signal indicates that the water conditioning system is ready for a regeneration cycle and the mechanical switch has been actuated, and positioning the valve from an in-service position to a backwash position in accordance with the first motor control signal;

providing feedback information that the valve is in the backwash position;

electronically generating a second motor control signal after a dwell time corresponding to the backwash position of the valve, and positioning the valve in the brine/slow rinse position in accordance with the second motor control signal;

providing feedback information that the valve is in the brine/slow rinse position;

electronically generating a third motor control signal after a dwell time corresponding to the brine/slow rinse position of the valve, and positioning the valve in the fast rinse/brine refill position in accordance with the third motor control signal;

providing feedback information that the valve is in the fast rinse/brine refill position; and electronically generating a fourth motor control signal after a dwell time corresponding to the fast rinse/brine refill position of the valve, and positioning the valve in the in-service position in accordance with the fourth motor control signal.

12. A method as recited in claim 11 wherein the mechanical switch is actuated at a settable time of day by a mechanical clock that physically interacts with the mechanical switch.

13. A method as recited in claim 11 wherein the regeneration ready signal is generated by:

measuring the cumulative water usage through the mineral tank to generate a cumulative water usage signal;

comparing the value of the cumulative water usage signal to a water usage set point; and generating the regeneration ready signal when the value of the cumulative water usage signal reaches the water usage set point.

14. A method as recited in claim 13 wherein the water usage set point can be adjusted mechanically by a user of the water conditioning system.

15. A method as recited in claim 11 wherein the regeneration ready signal is generated by:

electronically counting the number of days that have passed since the previous regeneration cycle;

comparing the number of days counted to a preselected value; and generating the regeneration ready signal when the number of days counted exceeds a preselected value.

16. A method as recited in claim 11 wherein the regeneration ready signal is generated by:

electrically setting the days of the week on which it is desired to trigger a regeneration cycle;

electronically incrementing a day-of-the-week value;

comparing the incremented day-of-the-week value to the day-of-the-week settings; and generating the regeneration ready signal when the incremented day-of-the-week value matches one of the day-of-the-week settings.

17. A method as recited in claim 11 wherein the dwell times corresponding to the backwash, brine/slow rinse, and fast rinse/brine refill positions can be adjusted by moving electrical jumpers.

18. In a water conditioning system having a mineral tank containing a bed of an ion exchange resin, a brine tank, and a valve system for directing fluid flow into and from the mineral tank, a control unit for controlling the operation of the valve system comprising:

a drive motor having an output shaft coupled to the valve system;

a board having a series of electrical contacts spaced physically along a path on the board;

a dual lead screw that can be driven by the drive motor to turn threads on the dual lead screw; and a movable carriage carrying an electrical contactor along the path on the board, wherein movement of the carriage is driven by turning the threads of the dual lead screw.

19. The invention as recited in claim 18 wherein the valve system is a rotary valve mounted to the top of the mineral tank.

20. The invention as recited in claim 18 wherein the movable carriage is located coaxially around the dual lead screw.

21. The invention as recited in claim 18 further comprising a follower coupled to the carriage, the follower having an indexing member that resides at least in part within the threads of the dual lead screw.

22. The invention as recited in claim 21 wherein the indexing member is a generally flat plate having a width slightly smaller than the width of the space between the threads of the dual lead screw.

23. The invention as recited in claim 18 wherein the board is a circuit board having a straight slot, and the series of electrical contacts are adjacent to the slot.

24. The invention as recited in claim 23 wherein the series of electrical contacts are located on one side of the slot, and a continuous electrical conductor is adjacent the slot on the other side of the slot, and the electrical contactor on the carriage spans the slot in the board so that the electrical contactor makes an electrical connection separately between the continuous electrical conductor and each one of the series of electrical contacts as the carriage moves from contact to contact.

25. The invention as recited in claim 18 further comprising a group of three sets of electrical jumper connections, the group including a set of backwash jumper connections, a set of brine/slow rinse jumper connections, and a set of fast rinse/brine refill jumper connections.

26. The invention as recited in claim 25 fruther comprising a set of electrical jumper connections for choosing between an interval regeneration scheme and a day of the week regeneration scheme.

27. The invention as recited in claim 18 further comprising a set of electrical jumper connections for choosing between an interval regeneration scheme and a day of the week regeneration scheme.

28. The invention as recited in claim 18 wherein the dual lead screw has forward threads and reverse threads, and the control unit further comprises a follower that is rotatably coupled to the carriage so that an indexing member of the follower resides at least in part in the threads of the dual lead screw, and the follower is allowed to rotate in an axis perpendicular to a longitudinal axis of the dual lead screw, thereby allowing the follower indexing member to move through both the forward threads and the reverse threads of the dual lead screw.

29. The invention as recited in claim 28 wherein the threaded portion of the dual lead screw has a first end corresponding to a starting location on the board and a second end corresponding to a distant location on the board, and the dual lead screw includes a first flat portion in the threads at the first end of the threads and a second flat portion in the threads at the second end portion of the threads.

30. The invention as recited in claim 18 further comprising a timer including a timer control knob that rotates to complete one full revolution during a 24 hour period, the timer control knob having a trigger fmger extending outward from the timer control knob to actuate an electric switch each time the timer control knob makes a complete revolution.

31. The invention as recited in claim 18 further comprising a water usage demand control unit including:

an adjustable potentiometer that can be adjusted to set a regeneration water usage set point, and generates an analog set point signal in response thereto;

a flow meter system measuring water usage and outputting a flow signal representative of the flow;

an accumulator that receives the flow signal from the flow meter system and outputs an analog cumulative water usage signal; and a comparator that receives the analog set point signal from the potentiometer and the analog cumulative water usage signal from the accumulator and outputs a digital signal indicating when the analog cumulative water usage signal exceeds the analog set point signal.

32. A valve control unit comprising:

a drive motor having an output shaft that rotates to control a valve;

a board having a series of electrical contacts spaced physically along a path on a board;

a dual lead screw that can be driven by the drive motor to turn threads on the dual lead screw; and a movable carriage carrying an electrical contactor along the path on the board wherein movement of the carriage is driven by turning the threads of the dual lead screw.

33. The valve control unit recited in claim 32 wherein the movable carriage is located coaxially around the dual lead screw.

34. The valve control unit recited in claim 32 further comprising a set of electrical jumper connections for choosing between an interval regeneration scheme and a day of the week regeneration scheme.

35. The valve control unit recited in claim 32 further comprising a follower coupled to the carriage, the follower having an indexing member that resides at least in part within the threads of the dual lead screw.

36. The valve control unit recited in claim 35 wherein the indexing member is a generally flat plate having a width slightly smaller than the width of the space between the threads of the dual lead screw.

37. The valve control unit recited in claim 32 wherein the dual lead screw has forward threads and reverse threads, and the valve control unit further comprises a follower that is rotatably coupled to the carriage so that an indexing member of the follower resides at least in part in the threads of the dual lead screw, and wherein the follower is allowed to rotate in an axis perpendicular to a longitudinal axis of the dual lead screw, thereby allowing the follower indexing member to move through both the forward threads and the reverse threads of the dual lead screw.

38. The valve control unit recited in claim 37 wherein the threaded portion of the dual lead screw has a first end corresponding to a starting location on the board and a second end corresponding to a distant location on the board, and the dual lead screw includes a first flat portion in the threads at the first end of the threads and a second flat portion in the threads at a second end of the threads.

39. The valve control unit recited in claim 32 wherein the board is a circuit board having a straight slot and the series of electrical contacts are adjacent the slot.

40. The valve control unit recited in claim 39 wherein the series of electrical contacts are located on one side of the slot, and a continuous electrical conductor is adjacent the slot on the other side of the slot, and the electrical contactor on the carriage spans the slot in the board so that the electrical contactor makes an electrical connection separately between the continuous electrical conductor and each one of the series of electrical contacts as the carriage moves from contact to contact.

41. The valve control unit recited in claim 32 further comprising a timer including a timer control knob that rotates to complete one full revolution during a 24 hour period, the timer control knob having a trigger finger extending outward from the timer control knob to actuate a mechanical electric switch each time the timer control knob makes a complete revolution.

42. The valve control unit recited in claim 32 further comprising a water usage demand control unit including:

an adjustable potentiometer that can be adjusted to set a regeneration water usage set point and generate an analog set point signal in response thereto;

a flow meter system measuring water usage and outputting a flow signal representative of the flow;

an accumulator that receives the flow signal from the flow meter system and outputs an analog cumulative water usage signal; and a comparator that receives the analog set point signal from the potentiometer and the analog cumulative water usage signal from the accumulator and outputs a digital signal indicating when the analog cumulative water usage signal exceeds the analog set point signal.

43. In a water conditioning system having a mineral tank containing a bed of an ion exchange resin, a brine tank, and a valve system for directing fluid flow into and from the mineral tank, a method of controlling the operation of the valve system for the regeneration of the ion exchange resin, the method comprising the steps of:

providing a series of distinct electrical contacts along a path, each distinct electrical contact corresponding to a predetermined regeneration cycle event;

providing an electrical signal separately to the distinct electrical contacts through a mobile electrical contactor;

carrying out a sequence of predetermined regeneration cycle events, each in response to the electrical signal from the distinct electrical contact receiving the electrical signal from the electrical contactor; and moving the electrical contactor sequentially to the next distinct electrical contact in the series upon the termination of each predetermined regeneration cycle event.

44. A method as recited in claim 43 wherein the first predetermined regeneration cycle event is triggered by an electrical contact provided by the actuation of a mechanical electric switch by a mechanical clock.

* * * * *